United States Patent [19]

Nakayama

[11] Patent Number: 4,796,733

[45] Date of Patent: Jan. 10, 1989

[54] OIL DAMPER

[75] Inventor: Hiromichi Nakayama, Yokohama, Japan

[73] Assignee: Nifco, Inc., Yokohama, Japan

[21] Appl. No.: 80,833

[22] Filed: Aug. 3, 1987

[30] Foreign Application Priority Data

Aug. 5, 1986 [JP] Japan ................. 61-183786

[51] Int. Cl.⁴ .............................................. F16D 57/02
[52] U.S. Cl. .................................. 188/291; 188/82.7; 188/290; 192/58 B
[58] Field of Search ............... 188/290, 291, 293, 294, 188/82.7, 82.77; 192/58 A, 58 B

[56] References Cited

U.S. PATENT DOCUMENTS

| 1,228,215 | 5/1917 | Junkers | 188/290 |
| 1,291,871 | 1/1919 | Hein | 192/58 B |
| 3,685,621 | 8/1972 | Gulick et al. | 192/58 B X |
| 4,346,749 | 8/1982 | Singletary et al. | 188/82.7 X |
| 4,352,304 | 10/1982 | Warner | 188/290 X |
| 4,513,473 | 4/1985 | Omata | 188/290 X |
| 4,574,423 | 3/1986 | Ito et al. | 188/291 X |
| 4,653,616 | 3/1987 | Mizusawa | 188/290 |
| 4,694,530 | 9/1987 | Foggini | 188/290 X |

FOREIGN PATENT DOCUMENTS 60-79032   6/1985  Japan .
61-24850   2/1986  Japan .
61-133134  8/1986  Japan .

Primary Examiner—George E. A. Halvosa
Attorney, Agent, or Firm—Schwartz & Weinrieb

[57] ABSTRACT

An oil damper is disclosed which comprises a cylindrical case open at one end and having a first engagement section formed upon the inner periphery thereof, an intermediate rotor having an inner cylinder and an outer cylinder, these cylinders being coaxial with respect to each other and defining an annular space open at one end, the outer periphery of the outer cylinder being provided with a second engagement section to be engaged with the first engagement section, the intermediate rotor being accommodated within the cylindrical case for rotation in only one direction, a cylindrical shaft rotor rotatably accommodated within the annular space, and viscous oil sealed within the annular space.

8 Claims, 5 Drawing Sheets

ID
OIL DAMPER

BACKGROUND OF THE INVENTION

1. Field of the Invention

This invention relates to an oil damper which can produce resistance torque with respect to rotation in only one direction.

2. Description of the Prior Art

Many oil dampers utilizing the viscosity resistance of oil have been proposed as mechanisms for braking rotation. For example, see Japanese Patent Public Disclosure No. SHO 61-24850 and Utility Model Application Nos. SHO 60-79032 and SHO 61-133134.

FIGS. 1 and 2 illustrate a typical oil damper of the prior art.

Referring to these figures, reference numeral 1 designates a cylindrical case open at one end, numeral 2 designates a disk-like rotor, and numeral 3 designates a shaft secured to the center of the rotor 2. The rotor 2 is rotatably accommodated within the case 1, and highly viscous oil (that is, grease) is sealed within the case 1 by means of a lid 5.

For this reason, when a sudden torque is applied to the shaft 3, sudden rotation is restricted by means of the resistance torque produced between one surface of the disk-like rotor 2 and the bottom of the case 1 and between the opposite surface of the rotor 2 and the lid 5, and the shaft 3 therefore rotates slowly.

With such a prior art oil damper, however, the resistance torque acting upon the disk-like rotor 2 is smaller in proportion to the distance from the center of the rotor 2. Therefore, high resistance torque cannot be obtained with a small-sized oil damper. That is, in order to obtain a sufficiently high resistance torque the diameter of the rotor 2 has to be increased, inevitably leading to an overall size increase of the damper assembly.

Furthermore, since the resistance torque varies in the radial direction of the rotor, it is difficult to obtain dampers having uniform resistance torque.

Furthermore, with the prior art oil damper, braking forces act during rotation in both the forward and reverse directions. It has been impossible to eliminate resistance torque in one direction and permit resistance torque in only the other direction.

OBJECTS OF THE INVENTION

This invention has been made in light of the above and its object is to provide an oil damper, which is small in size and can provide high resistance torque.

Another object of the invention is to provide an oil damper which generates resistance torque with respect to rotation only in one direction.

SUMMARY OF THE INVENTION

According to the invention, there is provided an oil damper which comprises a cylindrical case open at one end and having a first engagement section formed upon the inner periphery thereof, an intermediate rotor having an inner cylinder and an outer cylinder, these cylinders being coaxial with respect to each other and defining an annular space therebetween open at one end, the outer periphery of the outer cylinder being provided with a second engagement section to be engaged with the first engagement section, the intermediate rotor being accommodated within the cylindrical case for rotation in only one direction, a cylindrical shaft rotor rotatably accommodated within the annular space, and viscous oil sealed within the annular space.

As has been shown, with the oil damper according to the invention both the inner and outer peripheries of the cylindrical shaft rotor are in contact with the viscous oil so that it is possible to obtain high resistance torque with a compact construction. Furthermore, resistance is applied with respect to rotation in only one direction as a result of the engagement between the first and second engagement sections.

BRIEF DESCRIPTION OF THE DRAWINGS

The above and other objects and features of the invention will become more apparent from the following detailed description with reference to the accompanying drawings, wherein.

DETAILED DESCRIPTION OF THE PREFERRED EMBODIMENT

Figure 1:
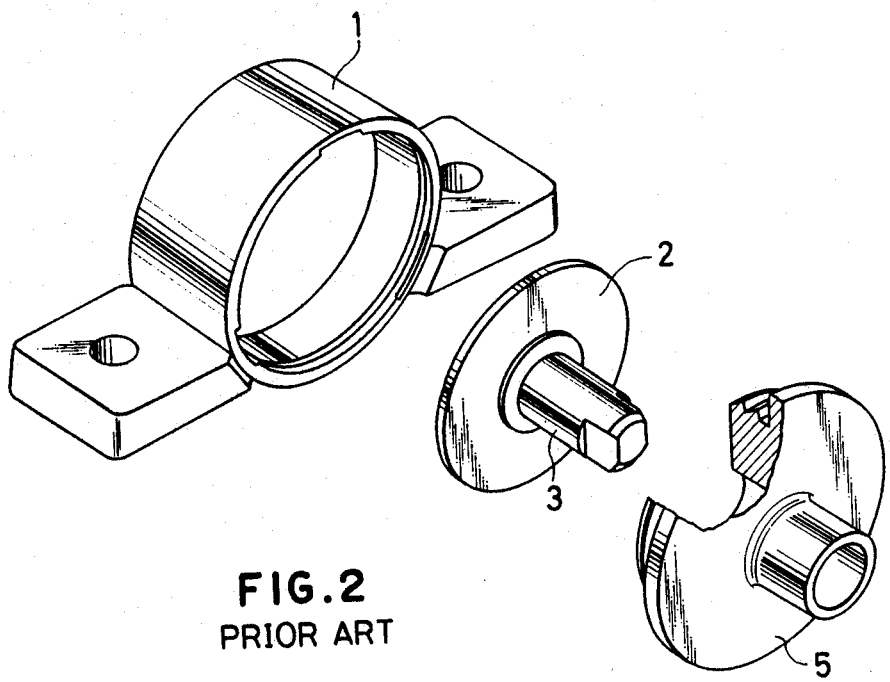
FIG. 1 is an exploded perspective view showing a prior art oil damper.
Figure 2:
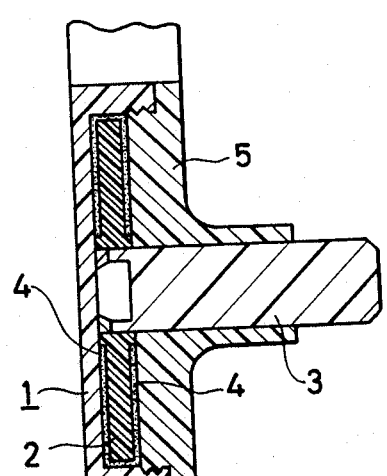
FIG. 2 is a sectional view showing the oil damper of FIG. 1 in an assembled state.

FIGS. 3 to 13 illustrate an embodiment of the oil damper according to the invention. Referring to the Figures, reference numeral 20 designates a cylindrical case having a bottom and open at one end. The outer periphery 20a of the case 20 is provided with two mounting legs 21a and 21b which are disposed perpendicular with respect to each other.

Figure 7:
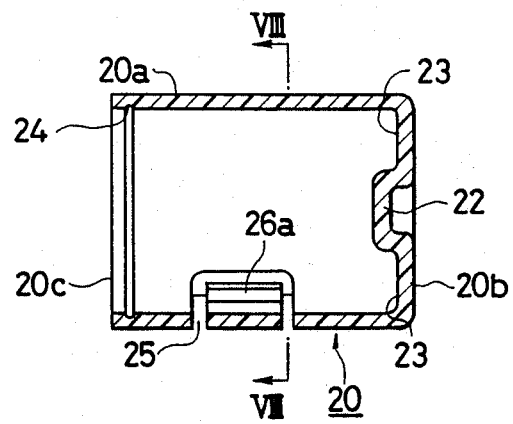
FIG. 7 is a sectional view showing a case of the oil damper shown in FIG. 3.
Figure 8:
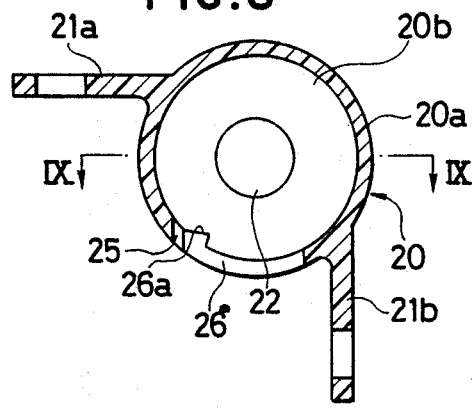
FIG. 8 is a sectional view taken along line VIII—VIII in FIG. 7.
Figure 9:
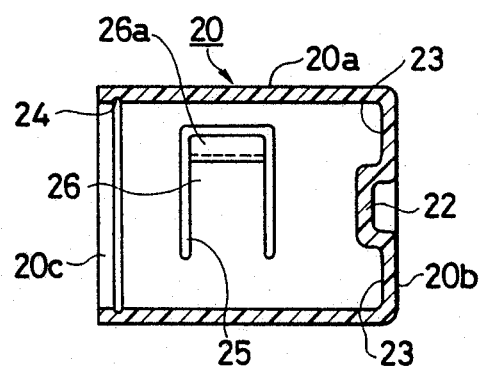
FIG. 9 is a sectional view taken along line IX—IX in FIG. 8.
Figure 10:
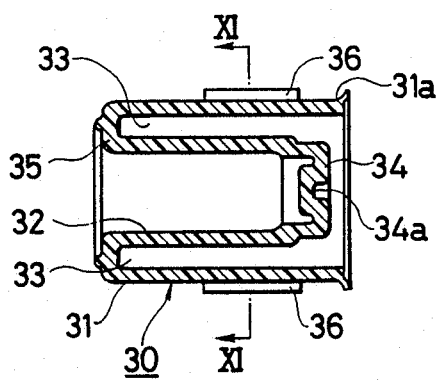
FIG. 10 is a sectional view showing an intermediate rotor of the oil damper shown in FIG. 3.
Figure 11:
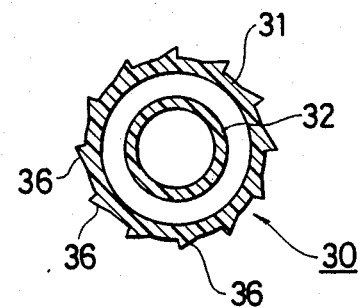
FIG. 11 is a sectional view taken along line XI—XI in FIG. 10.

As shown in FIGS. 7 to 9, the center of the bottom 20b of the case 20 is provided with a circular projection or boss 22 projecting toward the open end 20c. This circular projection 22 defines in the inner surface of the bottom 20b an annular groove 23 coaxial with the peripheral wall 20a for accommodating an annular bottom portion 35 of an intermediate rotor 30 as seen in FIGS. 5 and 10 and which will be described later.

Figure 5:
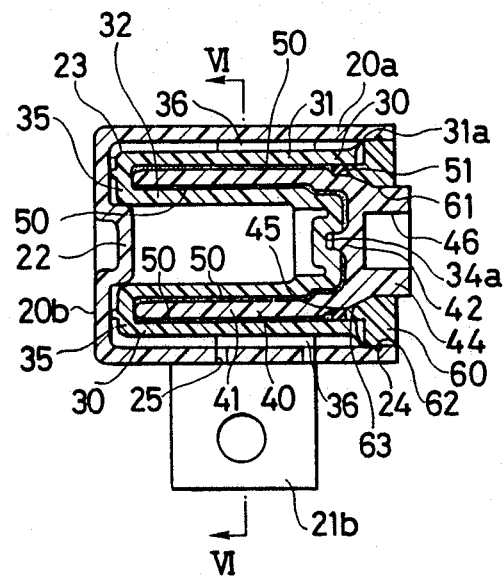
FIG. 5 is a sectional view taken along line V—V in FIG. 4.
Figure 13:
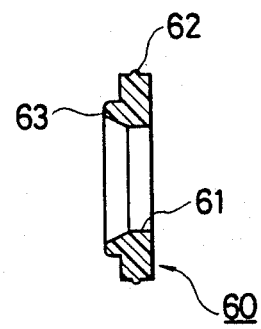
FIG. 13 is a sectional view showing a lid of the oil damper shown in FIG. 3.

The inner surface of the peripheral wall 20a is formed adjacent to the open end 20c with an annular recess 24 for receiving a lid 60 and an annular bead 62 thereof as is shown in FIGS. 5 and 13 and which will also be described later.

The peripheral wall 20a, as shown in FIGS. 7 and 9, is provided with a U-shaped slit 25. The portion surrounded by the U-shaped slit 25 constitutes a first engagement section 26 having a check pawl 26a formed upon the inner surface of the peripheral wall 20a and projecting substantially radially inwardly.

Figure 6:
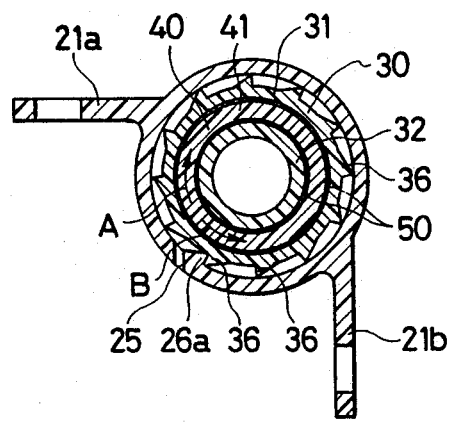
FIG. 6 is a sectional view taken along line VI—VI in FIG. 5.

As shown in FIGS. 5 and 6, the intermediate rotor 30 is accommodated within the case 20 such that it is rotatable in only one direction without being stopped by means of the first engagement section 26 of the case 20.

As shown in FIGS. 5, 6, 10 and 11, the intermediate rotor 30 consists of an outer cylinder 31 having an outer diameter slightly smaller than the inner diameter of the case 20 and a coaxial inner cylinder 32 extending from one end of the outer cylinder 31 into the outer cylinder 31. Thus, there is formed between the inner surface of the outer cylinder 31 and the outer surface of the inner cylinder 32 an annular space 33 open at one end for rotatably accommodating an annular section 41 of a shaft rotor 40.

The inner cylinder 32 has a bottom 34 which is formed in the center of its outer surface with a central recess 34a for receiving a central projection 42 of the shaft rotor 40 shown in FIG. 12 and which will be described later. The inner diameter of the inner cylinder 32 is slightly greater than the outer diameter of the circular projection 22 of the bottom 20b of the case 20. The outer periphery of the outer cylinder 31 is formed at the open end with an annular projection 31a.

Thus, as shown in FIG. 5, the intermediate rotor 30 is disposed such that the annular projection 31a at the open end of the outer cylinder 31 is in contact with the inner surface of the peripheral wall 20a of the case 20 and that the annular bottom 35 connecting the outer and inner cylinders 31 and 32 is received within the annular groove 23 of the case 20.

The outer periphery of the outer cylinder 31 is formed at a position corresponding to the check pawl 26a of the case 20 with a plurality of second engagement sections 36 (oppositely directed with respect to the check pawl 26a) arranged at predetermined intervals so as to be engaged with the check pawl 26a in order to prevent rotation in one direction.

Thus, even when it is intended to cause rotation of the intermediate rotor 30 in the clockwise direction as shown in FIG. 6, the rotation is prevented as a result of the engagement of one of the second engagement sections 36 of the intermediate rotor 30 with the check pawl 26a of the case 20. In the counterclockwise direction, however, the intermediate rotor 30 can be freely rotated because the first engagement section 26a of the case 20 is pushed and radially deformed by means of the second engagement sections 36 of the intermediate rotor 30 as they pass by the first engagement section 26.

As shown in FIGS. 5 and 6, the cylindrical section 41 of the shaft rotor 40 is rotatably accommodated within the annular space 33 of the intermediate rotor 30.

Figure 3:
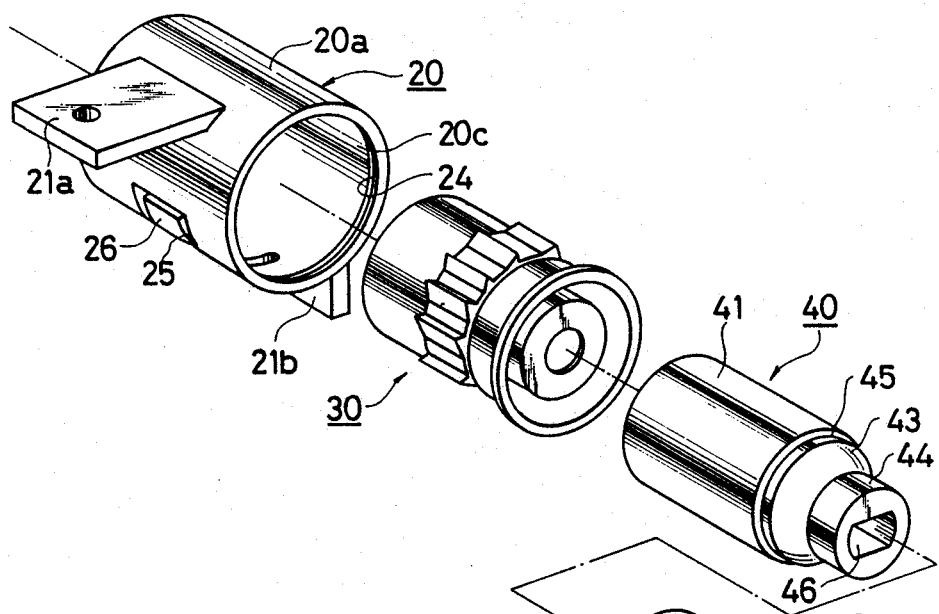
FIG. 3 is an exploded perspective view showing an embodiment of the oil damper according to the invention.
Figure 4:
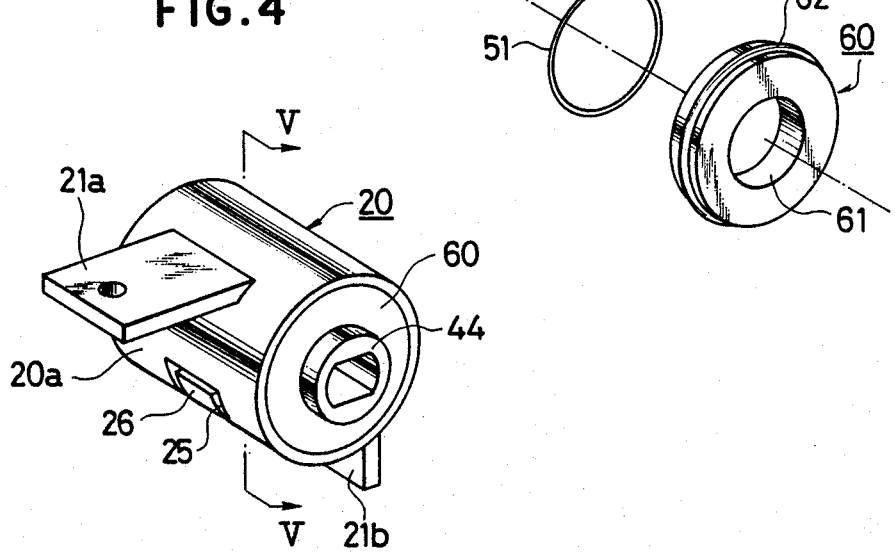
FIG. 4 is a perspective view showing the oil damper of FIG. 3 in an assembled state.
Figure 12:
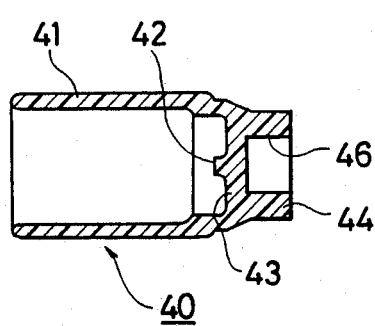
FIG. 12 is a sectional view showing a shaft rotor of the oil damper shown in FIG. 3.

As shown in FIGS. 3 and 12, the shaft rotor 40 includes the cylindrical section 41 open at one end and a shaft portion 44 which projects in a direction opposite that of cylindrical section 41 from a bottom portion 43 of the cylindrical portion 41. The center of the inner surface of the bottom 43 is provided with the central projection 42. The shaft portion 44 is provided with a shaft hole 46.

Upon the cylindrical section 41 is provided an annular portion 45, as seen in FIG. 3, for fitting an O-ring type packing 51 within the inner wall of the outer cylinder 31 of the intermediate rotor 30.

The cylindrical section 41 of the shaft rotor 40 is rotatably fitted within the annular space 33 of the intermediate rotor 30. Oil 50, for example, grease, is provided between the cylindrical section 41 and the annular space 33, and the packing 51, which is like an O-ring as shown in FIG. 5, is fitted between the annular portion 45 of the cylindrical section 41 and inner wall of the outer cylinder 31 of the intermediate rotor 30.

As shown in FIGS. 3 and 13, the lid 60 is disk-like, and it has a central hole 61 in which the shaft portion 44 of the shaft rotor 40 is rotatably disposed. The outer periphery is formed with a ridge 62 which is received within the annular recess 24 of the case 20. Furthermore, the lid 60 has a stepped portion 63 which is inserted between the outer periphery of the shaft rotor 40 and the inner periphery of the outer cylinder 31 of the intermediate rotor 30.

As shown in FIG. 5, the shaft portion 44 is inserted within the hole 61 of the lid 60, the packing 51 is press-fitted upon the stepped portion 63, and the ridge 62 is fitted within the annular recess 24 of the case 20 adjacent to the open end thereof, whereby the lid 60 is secured.

The case 20, intermediate rotor 30, shaft rotor 40 and lid 60 are all one-piece plastic moldings.

In use, the case 20 is secured via the mounting legs 21a and 21b, and the shaft which is to be braked by means of the oil damper is connected to the shaft portion 44 of the shaft rotor 40.

As shown in FIG. 6, when it is intended to cause rotation of the shaft rotor 40 in direction A (clockwise direction), the torque of the shaft rotor 40 is transmitted from the cylindrical section 41 to the intermediate rotor 30 by means of the inner and outer cylindrical portions 32 and 31 facing the inner and outer surfaces of the cylindrical section 41 via the viscosity resistance of the oil 50. As a result, the intermediate rotor 30 tends to be rotated together with the shaft rotor 40 in direction A. However, the rotation of the intermediate rotor 30 is actually prevented because of the engagement between the check pawl 26a of the case 20 and one of the second engagement sections 36. Therefore, the cylindrical section 41 of the shaft rotor 40 receives high resistance torque with respect to the stationary intermediate rotor 30 by means of the viscosity resistance of the oil 50. Thus, sudden rotation is restricted, and the shaft rotor 40 is rotated in a braked state.

When the shaft rotor 40 is rotated in the opposite direction B, the torque is similarly transmitted to the intermediate rotor 30 via the viscosity resistance of the oil, and the intermediate rotor 30 tends to be rotated in the direction B. The intermediate rotor 30 can actually be freely rotated in the direction B as the second engagement sections 36 pass by pawl 26a causing outward flexing of the first engagement section 26 which includes the check pawl 26a of the case 20. The shaft rotor 40 can thus be freely rotated at a high rate of speed in unison with the intermediate rotor 30.

In this way, in the oil damper high resistance torque is generated with respect to rotation in only one direction, and smooth rotation can be obtained in the opposite direction.

While an embodiment of the invention has been described in the foregoing, this embodiment is by no means limitative, and various changes and modifications are possible in the constitution of the individual parts thereof. For example, it is possible to change the shape of the case 20, intermediate rotor 30 and shaft rotor 40.

In the above embodiment, the case 20 is secured and the shaft rotor 40 is rotated. However, it is of course possible to provide a converse arrangement oil damper in which the shaft rotor 40 is stationary and the case 20 is rotatable.

As has been described in the foregoing, the oil damper according to the invention has the following excellent effects:

(i) Braking force is produced in only one direction and not in the other direction.

(ii) Resistance torque is produced at a position distant from the center of rotation in the radial direction (at the cylindrical section 41 of the shaft rotor 40), and resistance torque is produced over a large distance in the axial direction of the cylindrical section 41. Thus, it is possible to greatly reduce the overall size of the damper assembly without increasing the diameter of the case 20. Futhermore, it is possible to obtain very high resistance torque.

(iii) A major portion of the resistance torque is produced by means of the cylindrical section 41 having a fixed distance from the center of rotation (radius), so that it is possible to mass-produce resistance torque dampers having uniform characteristics free from variation.

What is claimed is:

1. An oil damper for braking a rotor shaft, comprising:
    a tubular case open at one end thereof and having first engagement means formed upon an inner peripheral surface portion thereof;
    an intermediate rotor including inner and outer cylinders integrally formed together wherein said inner cylinder extends coaxially from one end of said outer cylinder, so as to project into said outer cylinder, with a diametrical extent less than that of said outer cylinder so as to define an annular space which is open at the other end of said outer cylinder, an outer peripheral portion of said outer cylinder being provided with second engagement means for engagement with said first engagement means of said tubular case whereby said intermediate rotor is disposed within said tubular case such that it is rotatable in only one direction without being stopped by engagement of said first and second engagement means while being prevented from rotating in the opposite direction by engagement of said first and second engagement means, and wherein the open end of said annular space of said intermediate rotor corresponds to the open end of said tubular case;
    a shaft rotor having a tubular section open at one end thereof for rotatable accommodation within said annular space of said intermediate rotor; a transverse wall closing an opposite end of said tubular section of said shaft rotor; and rotor shaft socket means, open at one end thereof while having the other end thereof closed by said transverse wall, extending in an axial direction opposite that of said tubular section, relative to said transverse wall, for receiving said rotor shaft to be braked; and
    oil sealed within said annular space defined between said inner and outer cylinders of said intermediate rotor for providing adequate resistance with respect to the relative movement defined between said intermediate rotor and said shaft rotor.

2. An oil damper as set forth in claim 1, further comprising:
    mounting brackets integrally formed upon outer peripheral portions of said tubular case for mounting said oil damper upon a support surface.

3. An oil damper as set forth in claim 2, wherein:
    said mounting brackets are disposed substantially perpendicular with respect to each other.

4. An oil damper as set forth in claim 1, wherein:
    said inner and outer cylinders of said intermediate rotor are connected together at one end thereof so as to form a closed annular portion and an open central portion surrounded by said closed annular portion; and
    said tubular case has an end wall closing the other end thereof, a circular boss projecting internally into said tubular case from said end wall for disposition within said open central portion of said intermediate rotor, and an annular recess defined within said end wall and surrounding said boss for accommodating said closed annular portion of said intermediate rotor.

5. An oil damper as set forth in claim 4, further comprising:
    end wall means for closing the other end of said open central portion of said intermediate rotor, said end wall means including recess means defined within the surface thereof which is external to said open central portion of said intermediate rotor; and
    projection means defined upon said transverse wall of said shaft rotor and projecting axially internally within said tubular section for accommodation within said recess means of said end wall means of said intermediate rotor.

6. An oil damper as set forth in claim 1, further comprising:
    annular recess means defined within an inner peripheral portion of said tubular case within the vicinity of said open end thereof; and
    cover means, having an annular, radially outwardly projecting ridge for disposition within said annular recess means of said tubular case, for closing said open end of said tubular case.

7. An oil damper as set forth in claim 6, wherein:
    said cover means is provided with a central throughbore for permitting said socket means of said shaft rotor to project therethrough for connection with said rotor shaft to be braked.

8. An oil damper as set forth in claim 1, wherein:
    said first engagement means of said tubular case comprises a check pawl extending radially inwardly of said tubular case; and
    said second engagement means of said intermediate rotor comprises a plurality of pawl teeth disposed about the outer periphery of said outer cylinder.

* * * * *